UNITED STATES PATENT OFFICE.

GERMAN MORALES LOPEZ AND ALBERTO QUAGLIA, OF BUENOS AIRES, ARGENTINA.

MORDANT OR DYE AND PROCESS OF MAKING THE SAME.

1,348,431.    Specification of Letters Patent.    Patented Aug. 3, 1920.

No Drawing.    Application filed June 24, 1919. Serial No. 306,506.

*To all whom it may concern:*

Be it known that we, GERMAN MORALES LOPEZ and ALBERTO QUAGLIA, subjects of the Kings of Spain and Italy, respectively, and residents of Buenos Aires, Argentina, have invented a certain new and useful Mordant or Dye and Process of Making the Same, of which the following is a specification.

The present invention relates to a new industrial product capable of being utilized as a mordant for fixing the colors of silks and other fabrics and materials, or as a dye for coloring the same, and for strengthening the tissues of such fabrics or materials, as well as for the manufacture of inks, for tanning and for other purposes of an analogous nature.

According to the invention, the fruit of the lignumvitæ tree (*Cisalpinia melanocarpe*), or equivalent tropical American zygophyllaceous tree of the genus guaiacum, is collected in a fully ripened state and desiccated either in the open air or in special stoves or the like until the volatile juices are lost and the gummy parts have become sufficiently dried to admit of their being triturated in an ordinary triturating machine. At the completion of the triturating operation, the powder obtained thereby is screened and then compressed.

We claim as our invention:—

1. The herein-described process of obtaining a new industrial product, consisting in desiccating the fruit of a tree of the genus guaiacum until the volatile juices are lost and the gummy parts have become dried, and then subjecting the said dried gummy parts to a triturating action to obtain a powder.

2. The herein-described process of obtaining a new industrial product, consisting in desiccating the fruit of a tree of the genus guaiacum until the volatile juices are lost and the gummy parts have become dried, subjecting the dried gummy parts to a triturating action, and then screening and compressing the powder thus obtained.

3. As a new industrial product, a powder obtained by desiccating the ripened fruit of a tree of the genus guaiacum, and then triturating the dried gummy parts of the fruit resulting from the triturating operation.

4. As a new industrial product, a screened and compressed powder obtained from the ripened fruit of a tree of the genus guaiacum by successively desiccating the fruit and then triturating the dried gummy parts thereof.

Signed at Buenos Aires, Argentina, this 22d day of May, A. D. 1919.

GERMAN MORALES LOPEZ.
ALBERTO QUAGLIA.